March 6, 1962 J. A. PALMER ETAL 3,023,792
RADIAL ARM SAW
Filed Oct. 2, 1957 6 Sheets-Sheet 1
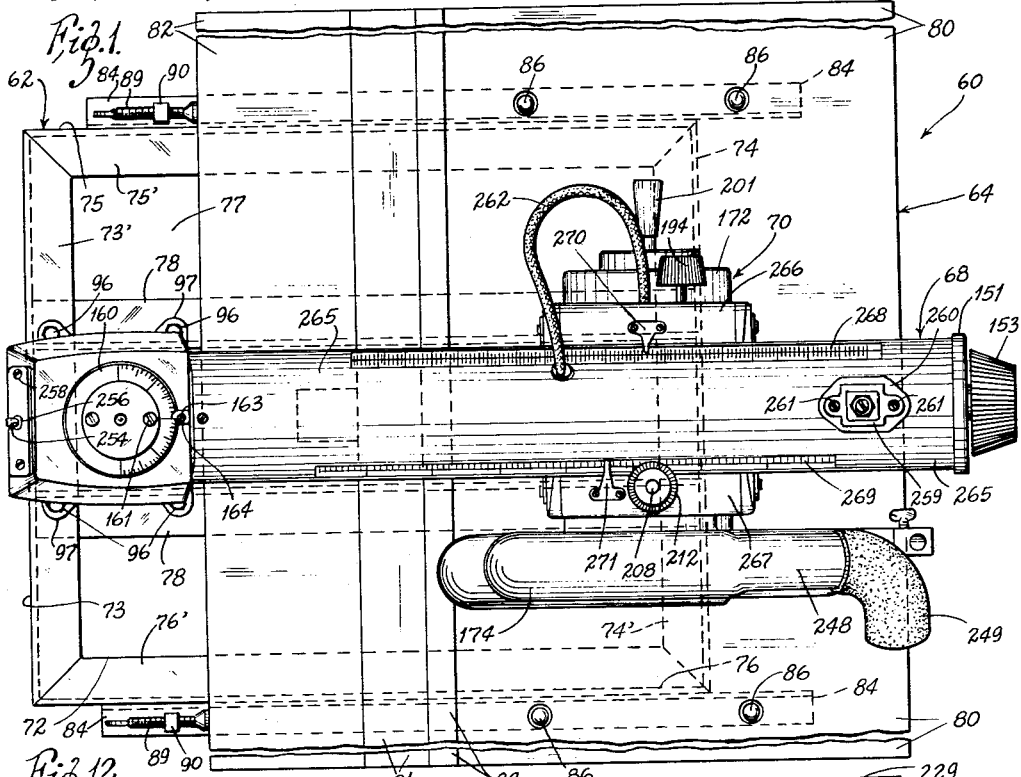
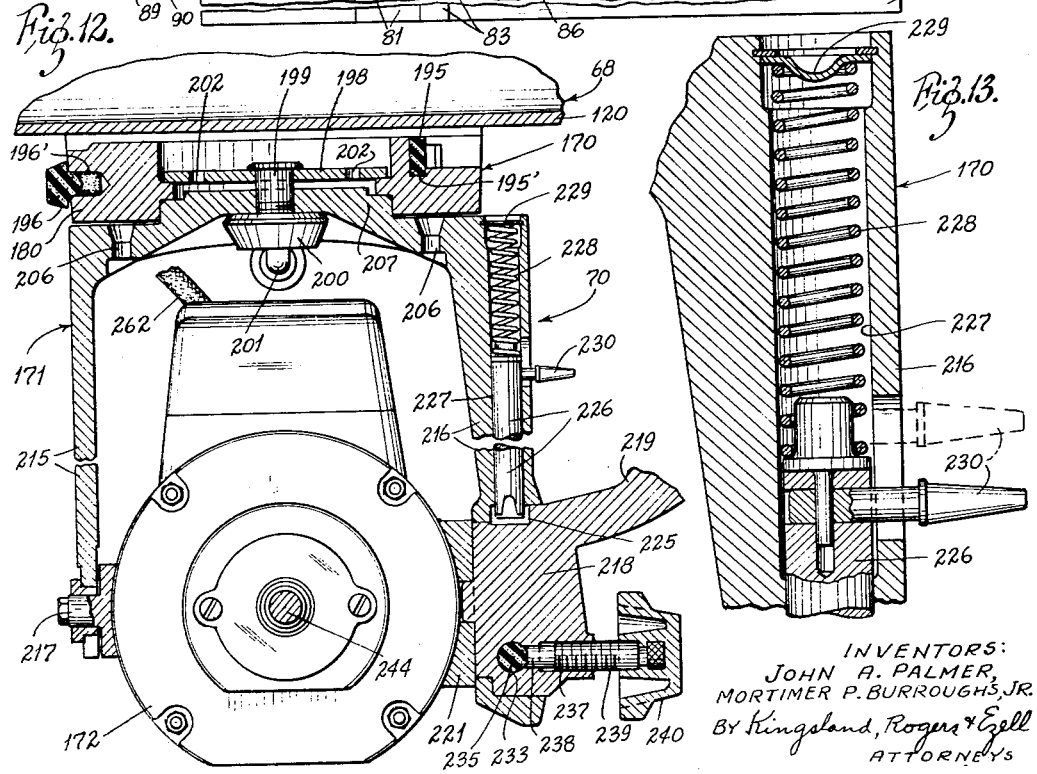
INVENTORS:
JOHN A. PALMER,
MORTIMER P. BURROUGHS, JR.
BY Kingsland, Rogers & Ezell
ATTORNEYS

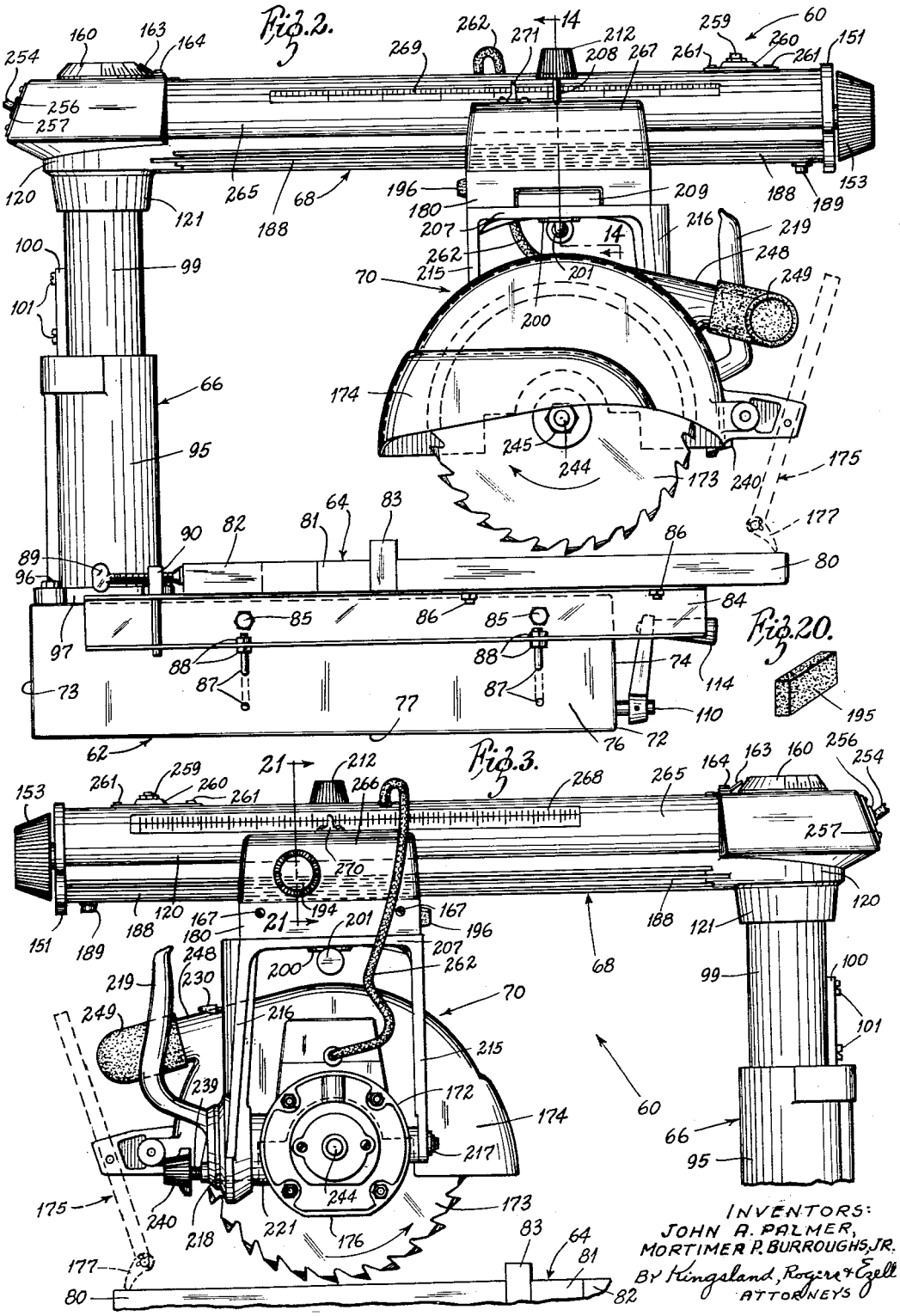

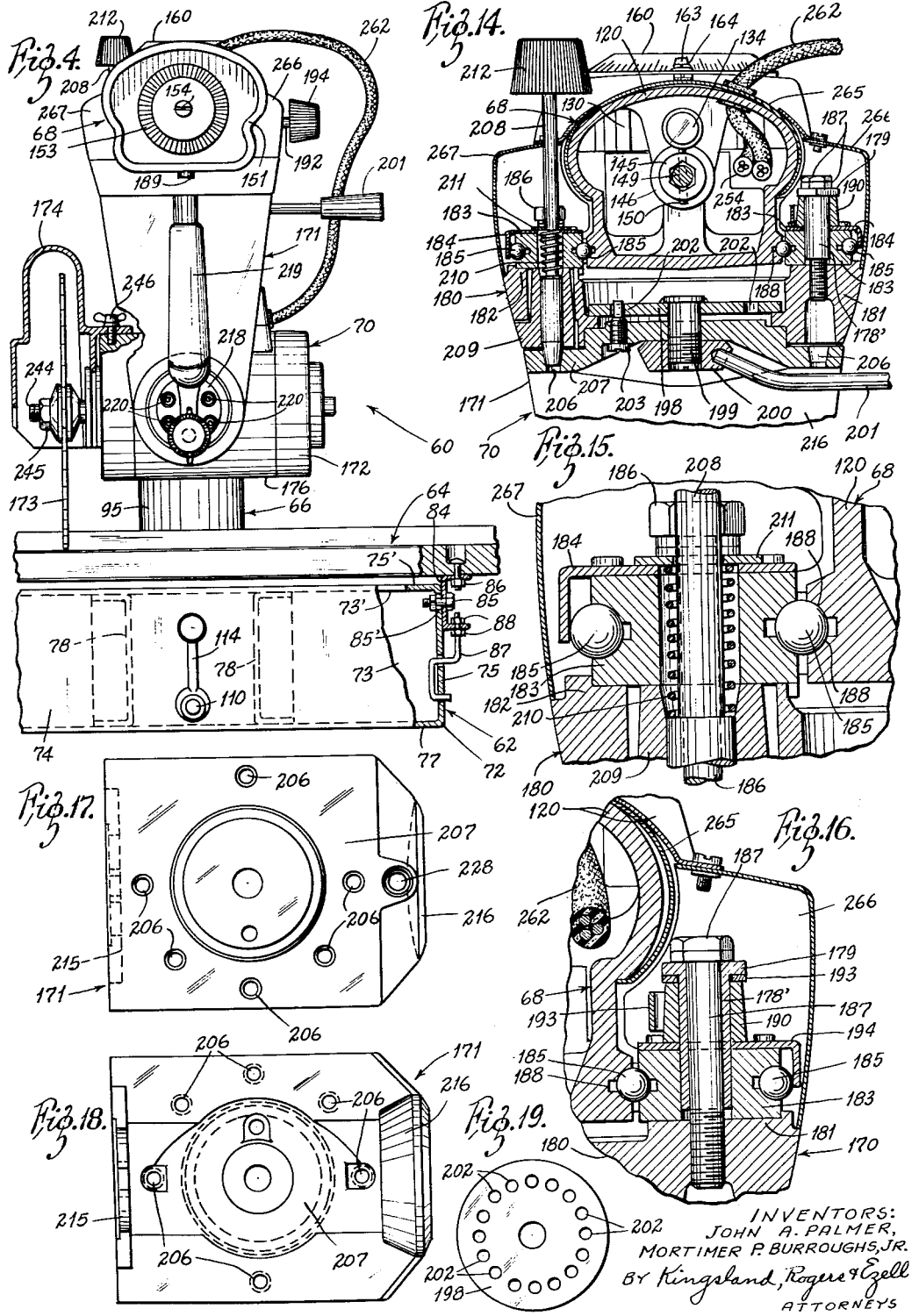

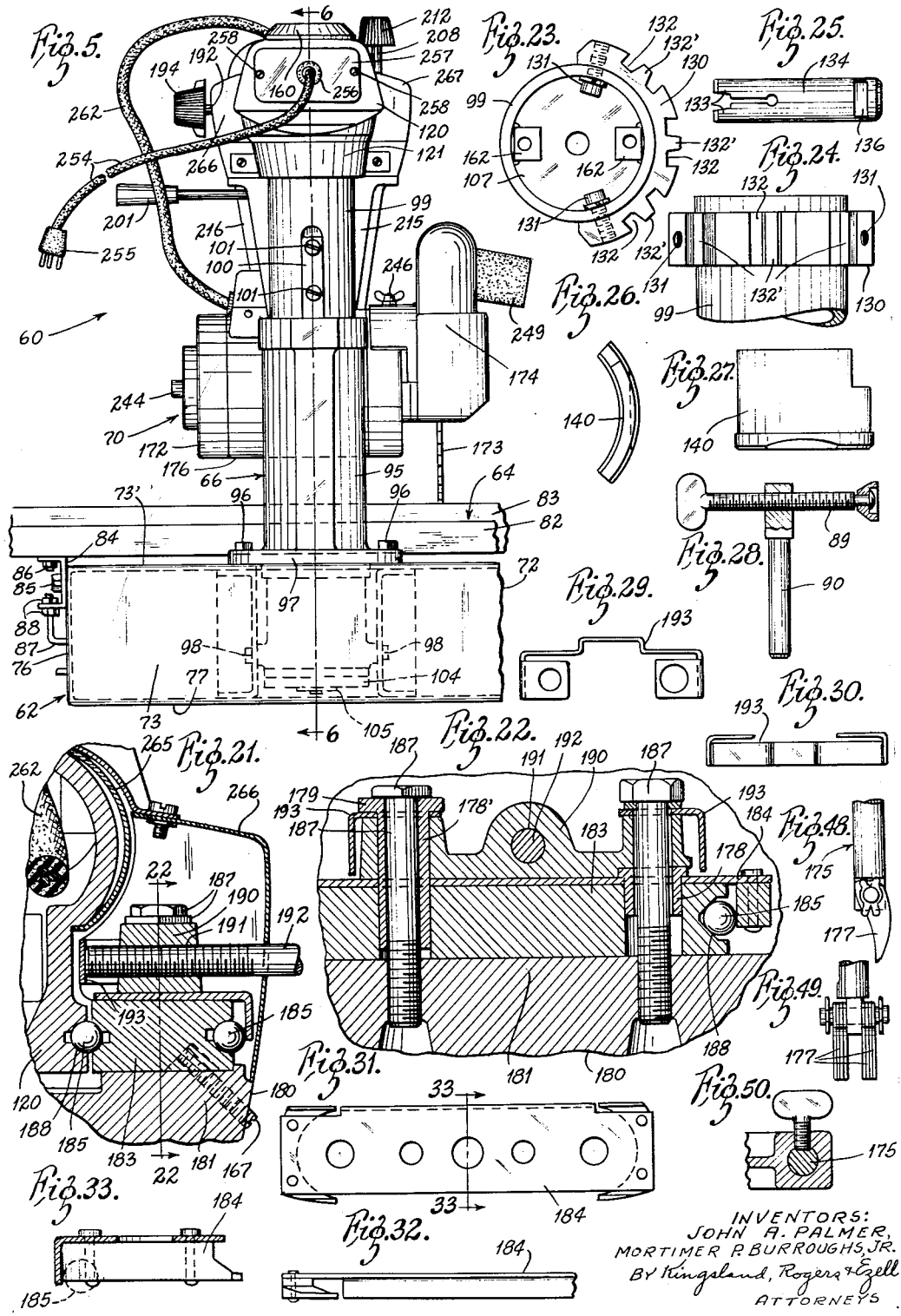

March 6, 1962 J. A. PALMER ETAL 3,023,792
RADIAL ARM SAW
Filed Oct. 2, 1957 6 Sheets-Sheet 5
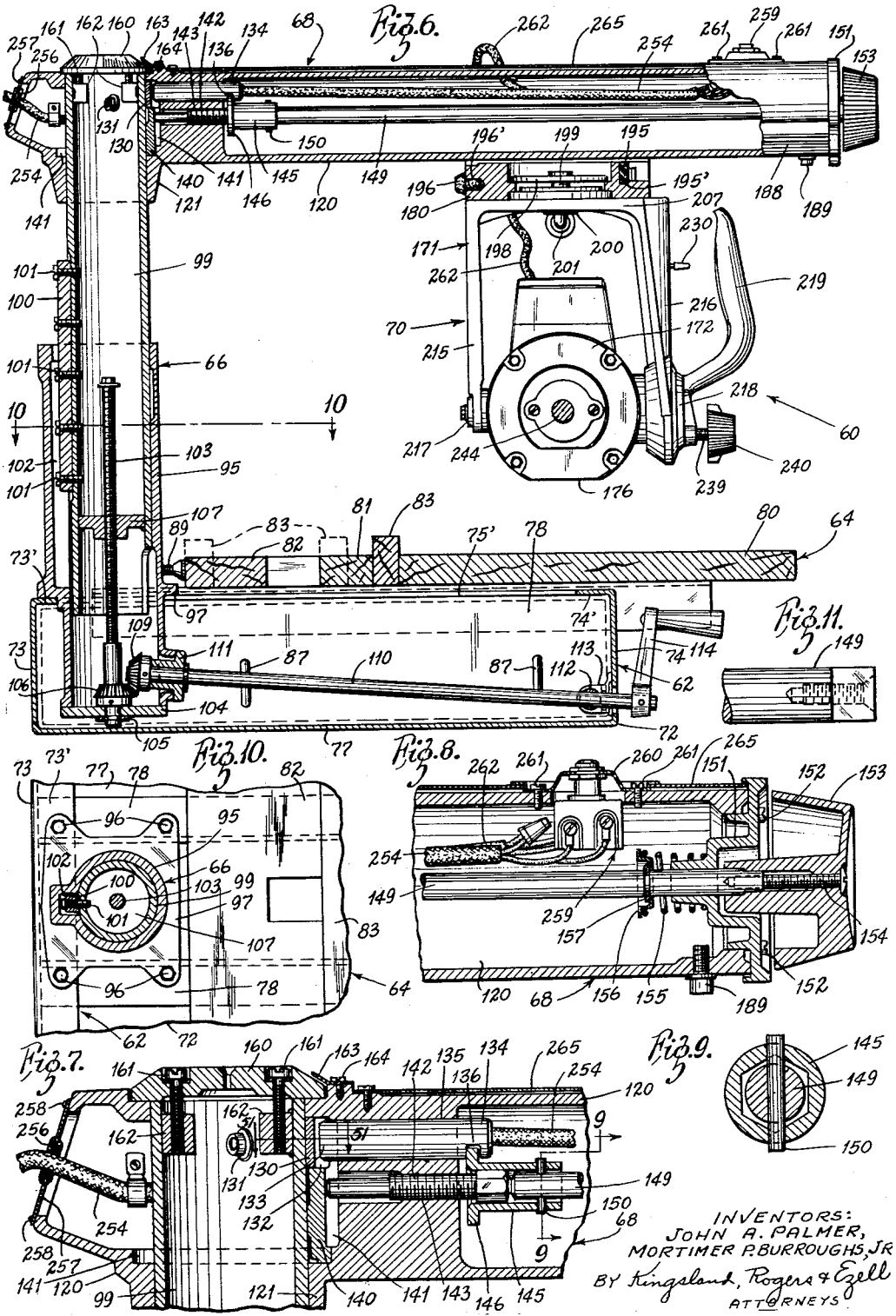
INVENTORS:
JOHN A. PALMER,
MORTIMER P. BURROUGHS, JR.
BY Kingsland, Rogers & Ezell
ATTORNEYS

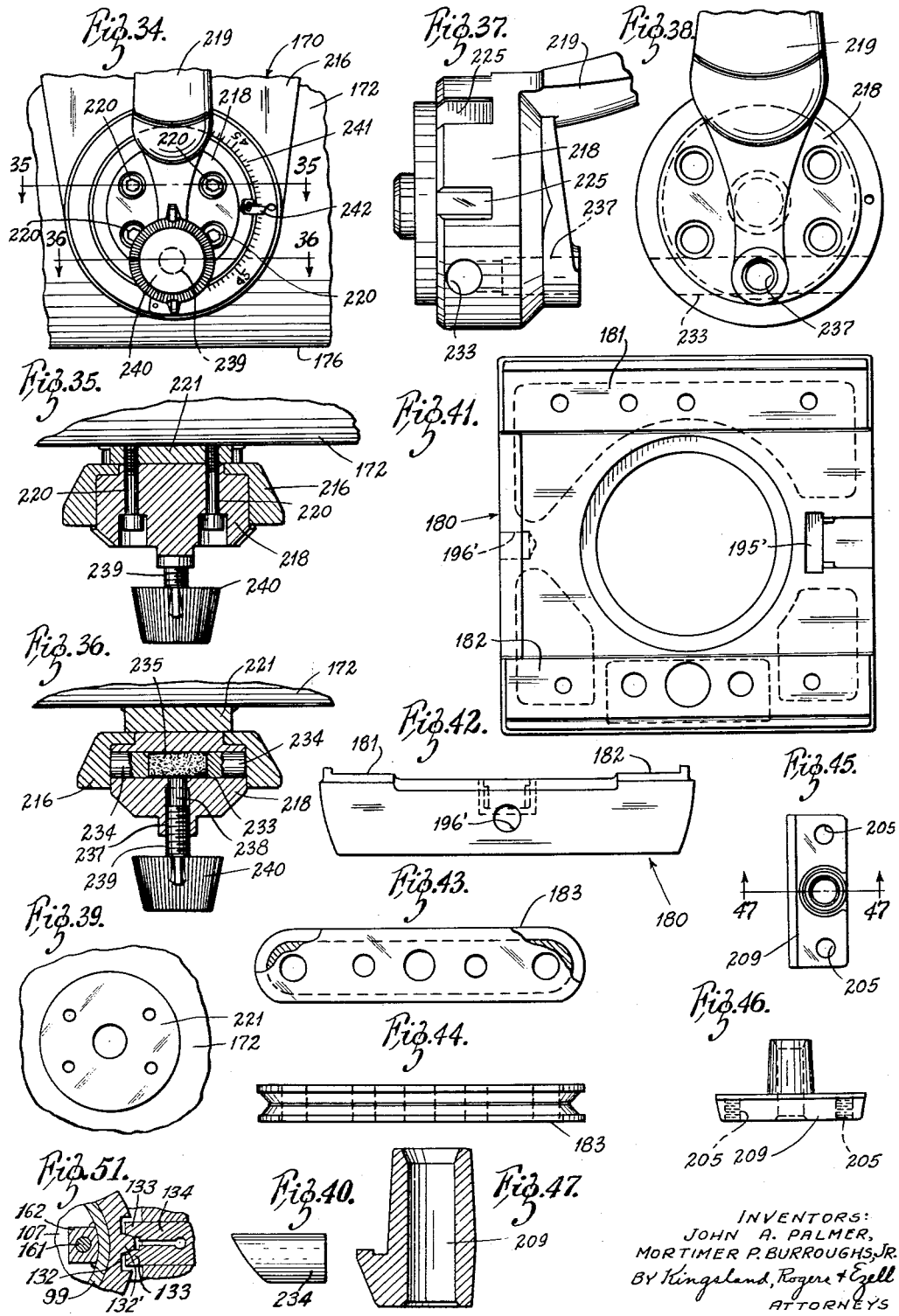

United States Patent Office 3,023,792
Patented Mar. 6, 1962

3,023,792
RADIAL ARM SAW
John A. Palmer, Tucson, Ariz., and Mortimer P. Burroughs, Jr., University City, Mo., assignors to The Emerson Electric Manufacturing Company, St. Louis, Mo., a corporation of Missouri
Filed Oct. 2, 1957, Ser. No. 687,792
6 Claims. (Cl. 143—6)

The present invention relates generally to powered working tools, and more particularly to a powered radial arm saw.

In brief, the present improved novel radial saw includes a vertically adjustable upright standard mounted upon a horizontal base which also supports a work table. A novel swinging radial arm is mounted on the upper end of the standard and includes readily manipulable means for securing the radial arm in selected position of movement and for releasing it. A motor and saw blade assembly is mounted on the radial arm for travel therealong and includes multiple novel adjustments and locking devices for employing the saw blade in respect to a workpiece as required.

An object of the present invention is to provide a novel radial arm saw which incorporates novel improvements in release and locking devices for positioning the radial arm and for positioning the saw blade as required.

Another object is to provide a novel radial arm saw which includes novel release and locking means for adjusting the radial arm about the vertical standard on which it is rotatably mounted.

Another object is to provide a novel radial arm saw which includes novel release and locking mechanism for movement of the motor and saw blade assembly about a horizontal axis.

Another object is to provide a novel radial arm saw which includes novel carriage and yoke structure movable in relationship to each other and to the radial arm.

Another object is to provide a novel radial arm saw which includes a novel carriage structure for movement of the saw blade and motor assembly along the radial arm.

Another object is to provide a novel radial arm saw which includes a novel adjustment arrangement for insuring cutting action of the saw blade in the plane thereof.

Another object is to provide a novel radial arm saw which is constructed for long efficient service at minimum maintenance and which can be used readily for its intended purpose.

Another object is to provide a novel radial arm saw which has great rigidity effected in major part through a radial arm of closed transverse cross section.

Another object is to provide a novel radial arm saw which has front controls for elevation of the saw blade and for positioning of the radial arm and saw blade, and for energizing and deenergizing of the power.

The foregoing and other objects and advantages are apparent from the following description taken with the accompanying drawings, in which:

FIGURE 1 is a top plan view of a radial arm saw constructed in accordance with the teachings of the present invention, the worktable being broken away to save space (Sheet 1);

FIGURE 2 is a right side elevational view thereof (Sheet 2);

FIGURE 3 is a left side elevational view thereof (Sheet 2);

FIGURE 4 is a front elevational view thereof, part of the work table being broken away to save space (Sheet 3);

FIGURE 5 is a rear elevational view thereof, part of the work table being broken away to save space (Sheet 4);

FIGURE 6 is a vertical longitudinal cross-sectional view on substantially the line 6—6 of FIGURE 5, the motor and free end of the radial arm being in elevation and the guard and saw being omitted for clarity (Sheet 5);

FIGURE 7 is an enlarged fragmentary view of the upper left portion of FIGURE 6 (Sheet 5);

FIGURE 8 is an enlarged fragmentary vertical longitudinal cross-sectional view of the free end of the radial arm (Sheet 5);

FIGURE 9 is a further enlarged transverse cross-sectional view on substantially the line 9—9 of FIGURE 7 (Sheet 5);

FIGURE 10 is a horizontal cross-sectional view on substantially the line 10—10 of FIGURE 6 (Sheet 5);

FIGURE 11 is an enlarged fragmentary plan view of the forward end of the arm latch shaft (Sheet 5);

FIGURE 12 is an enlarged fragmentary vertical longitudinal cross-sectional view of the central portion of FIGURE 6, showing details of the motor and saw blade assembly (Sheet 1);

FIGURE 13 is a further enlarged fragmentary view of the right side portion of FIGURE 12 (Sheet 1);

FIGURE 14 is an enlarged vertical transverse cross-sectional view on substantially the line 14—14 of FIGURE 2 (Sheet 3);

FIGURE 15 is a further enlarged fragmentary view of the lower left side portion of FIGURE 14 (Sheet 3);

FIGURE 16 is a further enlarged fragmentary view of th right side portion of FIGURE 14 (Sheet 3);

FIGURE 17 is a top plan view of the yoke (Sheet 3);

FIGURE 18 is a bottom plan view of the yoke (Sheet 3);

FIGURE 19 is a plan view of the yoke clamp plate (Sheet 3);

FIGURE 20 is a perspective view of the front bumper (Sheet 2);

FIGURE 21 is an enlarged fragmentary vertical transverse cross-sectional view on substantially the line 21—21 of FIGURE 3 (Sheet 4);

FIGURE 22 is a fragmentary vertical longitudinal cross-sectional view on substantially the line 22—22 of FIGURE 21 (Sheet 4);

FIGURE 23 is a top plan view of the standard column with the arm latch attached (Sheet 4);

FIGURE 24 is a front elevation of the parts of FIGURE 23 (Sheet 4);

FIGURE 25 is a top plan view of the arm latch pin (Sheet 4);

FIGURE 26 is a top plan view of the brake shoe (Sheet 4);

FIGURE 27 is a front elevational view of the brake shoe (Sheet 4);

FIGURE 28 is a view partly in section of the table adjustment screw or clamp assembly (Sheet 4);

FIGURE 29 is a top plan view of the carriage lock shoe (Sheet 4);

FIGURE 30 is a side view of the carriage lock shoe (Sheet 4);

FIGURE 31 is a top plan view of one ball bearing retainer assembly for mounting the carriage (Sheet 4);

FIGURE 32 is a side view of the retainer assembly of FIGURE 31, the right end portion being omitted to have space (Sheet 4);

FIGURE 33 is an enlarged vertical transverse cross-sectional view on substantially the line 33—33 of FIGURE 31 (Sheet 4);

FIGURE 34 is an enlarged fragmentary view of the lower central portion of FIGURE 4 (Sheet 6);

FIGURE 35 is a horizontal cross-sectional view on substantially the line 35—35 of FIGURE 34 (Sheet 6);

FIGURE 36 is a horizontal cross-sectional view on substantially the line 36—36 of FIGURE 34 (Sheet 6);

FIGURE 37 is a side view of the motor indexing member, the handle being broken away (Sheet 6);

FIGURE 38 is a front elevational view of the parts of FIGURE 37 (Sheet 6);

FIGURE 39 is an elevational view of a portion of the motor with the trunnion affixed thereto (Sheet 6);

FIGURE 40 is an enlarged side elevational view of one of the brake shoes (Sheet 6);

FIGURE 41 is a top plan view of the carriage (Sheet 6);

FIGURE 42 is a rear elevational view of the carriage (Sheet 6);

FIGURE 43 is a top plan view of the carriage ball race (Sheet 6);

FIGURE 44 is a side elevational view of the carriage ball race (Sheet 6);

FIGURE 45 is a top plan view of the latch pin housing (Sheet 6);

FIGURE 46 is a side elevational view of the latch pin housing (Sheet 6);

FIGURE 47 is an enlarged cross-sectional view on substantially the line 47—47 of FIGURE 45 (Sheet 6);

FIGURE 48 is a side elevational view of the lower end of the anti-kickback pawl assembly (Sheet 4);

FIGURE 49 is a rear elevational view of the parts of FIGURE 48 (Sheet 4);

FIGURE 50 is a horizontal cross-sectional view through the saw guard extension illustrating the pawl assembly of FIGURES 48 and 49 clamped in place (Sheet 4); and FIGURE 51 is a horizontal section on line 51—51 of FIGURE 7.

Referring to the drawings more particularly by reference numerals, 60 indicates generally a radial arm saw incorporating the principles of the present invention. Broadly, the radial arm saw 60 includes a supporting base 62 on which is disposed a work table 64 (FIGURES 1, 2 and 4-6), an upright standard 66 mounted on the base 62 (FIGURES 1-3, 5-7, and 10), a radial arm 68 rotatably mounted on the upper end of the standard 66 (FIGURES 1-9 and 14), and a motor and disc saw blade assembly 70 mounted on the radial arm 68 for travel therealong and for multiple adjustment in respect thereto (FIGURES 1-6, 12-19, 21, 22, and 31-50).

More specifically considering the several views of the drawings, the base 62 comprises a heavy reinforced metal casing 72 having a rear wall 73, a front wall 74, side walls 75 and 76, and a bottom wall 77 which may be formed integral as shown, or otherwise constructed. The walls 73, 74, 75 and 76 have turned-over horizontal flanges 73', 74', 75', and 76', respectively (FIGURE 1). Spaced channel members 78 parallel the side walls 75 and 76 and are welded or otherwise secured to the rear wall 73 and the front wall 74.

The work table 64 may comprise a main front flat board 80, rear boards 81 and 82, and a rip fence 83 (FIG. 2). The table 64 is mounted on the base 62 by means of two channel members 84, one channel member 84 being adjustably secured by spaced nut and bolt assemblies 85 to each side wall 75 and 76, the bolts extending through suitable vertical slots 85' in the said walls (FIGS. 2 and 4). Countersunk nut and bolt assemblies 86 secure the flat board 80 of the table 64 to the upper flanges of the channel members 84. Hook members 87 and nuts 88 engaging the threaded upper ends anchor the channel members 84 against vertical movement, but upon loosening, permit vertical adjustment thereof. The rear boards 81 and 82 and the rip fence 83 are free for movement about, as described. A screw or clamp 89 is threadedly mounted on each channel member 84 near the rear end thereof by means of a post 90 having a threaded eye at the upper end, and engages the rear edge of the rear board 82 of the table 64 to keep the boards 81 and 82 and the rip fence 83 in position (FIGS. 1, 2, and 28).

The upright standard 66 comprises an outer generally cylindrical casing or hollow post 95 which extends upwardly from and downwardly between the channel members 78 and is secured to the upper flanges thereof by nut and bolt assemblies 96, the bolts of which extend through an external flange 97 integral with the casing 95 (FIGS. 1, 2, 5 and 6). Opposed bolts 98 extend through the channel members 78 and threadedly engage integral bosses in the base of the outer casing 95 (FIG. 5). Telescopically mounted in the outer casing 95 is an inner cylindrical casing or hollow post 99. To prevent relative rotation between the casings 95 and 99, the inner casing 99 has an axially extending strip 100 secured thereto by screws 101 which moves in a guide channel 102 formed integral with the outer casing 95 (FIG. 6).

The inner casing 99 is vertically adjusted in the outer casing 95 (FIG. 6). A threaded shaft 103 is rotatably mounted in a plate 104 welded or otherwise secured to the lower end of the outer casing 95, being maintained against vertical movement by a snap ring 105. A bevelled gear 106 is pinned to the lower end of the shaft 103. Threadedly mounted on the shaft 103 is a rider disc 107 which is welded to the inner casing 99 as shown so that it will not rotate, but will lift or lower the inner casing 99 as the shaft 103 is selectively rotated. For rotating the shaft 103, there is provided a second bevelled gear 109 in engagement with the bevelled gear 106 which is pinned to one end of a long shaft 110 mounted in a bearing 111 welded or otherwise secured in an opening formed in the base of the outer casing 95. The shaft 110 extends forwardly through the ball 112 of a bearing 113 bolted to the front wall 74 and through a suitable opening in the front wall 74 of the base 62 and receives an operating handle 114 on the front end. Hence, the standard 66 may be adjusted vertically by an operator standing at the front of the saw 60.

The radial arm 68 is rotatably mounted on the upper end of the standard 66 and comprises a rigid hollow elongated casting 120 of cross section shown in FIGURE 14 (FIGS. 1-9, 14, and 23-27). The rear end of the casting 120 is enlarged to form a bearing portion 121 which surrounds the upper end of the inner casing 99 (FIG. 6). For locking the radial arm 68 in certain provided positions of movement and for supporting it against dropping, an arm latch member 130 is secured to the inner casing 99 near the top thereof by bolts 131 on which the upper end of the bearing portion 121 is disposed (FIGS. 6, 7, 23-25). The latch member 130 has pairs of similar formed recesses 132 spaced at forty-five degrees, each pair being separated by a central camming tooth 132'. A selected tooth 132' receives the forked ends 133 of a clothes pin type arm latch pin 134 which is slidably mounted in a horizontal bore 135 in the casting 120. The engaged tooth 132' cams or spreads the ends 133 so that the pin 134 in effect locks within the bore 135, as shown in FIG. 51, thereby eliminating play between the radial arm 68 and the standard 66. The pin 134 has a transverse slot 136 with an arcuate bottom near the end remote from the reduced end 133 for a purpose described below.

For securing the radial arm 68 in a selected position of movement between or beyond the positions of movement determined by the latch member 130, a brake shoe 140 is provided which floats in a recess 141 formed in the casting 120 and is engageable with the inner casing 99 (FIGS. 6, 7, 26 and 27). An actuator bolt 142 is threadedly mounted in a threaded bore 143 in the casting 120, and has the end thereof in engagement with the brake shoe 140 and the hexagonal head thereof in a coupling member 145 having an internal hexagonal cross section. The coupling member 145 has an annular flange 146 which enters the transverse slot 136 of the latch pin 134. The radius of the annular flange 146 and of the bottom of the slot 136 are substantially the same, hence, the latch pin 134 will be maintained in the position of FIGURE 6 against rotation. For rotating the actuator bolt 142 and for moving the latch pin 134 longitudinally, a rod 149 has the inner end secured to the coupling member 145 by a pin 150, the inner end of the rod 149 being spaced from the head of the bolt 142 a very small distance when the latch pin 134 is in locking position and the brake shoe 140 is engaged by the bolt 142. The other end of the rod 149 has bearing support in a member 151 which closes the end of the casing 120 and is secured thereto by screws 152 (FIG. 8). An actuating knob 153 is secured to the outer end of the rod 149 by a screw 154, the end of the rod 149 and a cavity in the knob 153 being of square or other desired cross section to insure against relative rotation. A compression spring 155 engages the member 151 and a cup 156 to bias inwardly the rod 149 and the latch pin 134. The cup 156 is stopped by a clip 157 engaging a groove in the rod 149. Hence, to free the brake shoe 140, the knob 153 is rotated counterclockwise. A turn or two moves the head of the bolt 142 into engagement with the end of the rod 149 and further rotation of the knob 153 will move the pin 134 to break the firm wedging engagement of the ends 133 of the latch pin 134 with the tooth 132' and against the bore 135. The radial arm 68 may then be rotated after pulling the knob 153 outwardly and releasing the latch pin 134.

A cap 160 closes the upper end of the casing 99 and is secured thereto by screws 161 threadedly engaging lugs 162 welded inside the casing 99 (FIGS. 1, 6 and 7). The cap 160 has suitable dial markings thereon with which cooperates a pointer 163 secured to the casing 120 by a screw 164. The cap 160 prevents accidental vertical displacement of the radial arm 68.

The motor and disc saw blade assembly 70 includes a carriage unit 170 (FIGS. 12 and 13), a yoke member 171, a motor 172, a disc saw blade 173, a saw blade guard 174, and an anti-kickback device 175. It will be noted that the motor 172 has a flat base 176 (FIGS. 3 and 6) which brings the assembly 70 closer to the work table 64. The anti-kickback device 175 has pawl elements 177.

The carriage unit 170 includes a base casting 180 of the configuration shown in FIGURES 6, 14, 41 and 42. The base casting 180 has side portions 181 and 182 on each of which is mounted a ball bearing race 183 of the configuration of FIGURES 43 and 44, the right hand one of which is adjustable as appears below. Ball bearing retainers 184 (FIGS. 31–33) retain ball bearings 185 in the races 183. Bolts 186 secure the left hand retainer 184 in position and the race 183 to the base casting 180 (FIGS. 14 and 15), and longer bolts 187 and bolts 186 adjustably secure the right hand retainer 184 in position and the race 183 to the base casting 180 (FIGS. 14, 16, 21 and 22). In each instance, the outer bolts 186, 187 are surrounded by bushing sleeves 178 which lock the retainers 184 to the races 183 for simultaneous movement, as required. The casting 120 has a race 188 along each side for receiving the ball bearings 185.

The bolts 187 also secure in position a casting 190 which has a threaded bore 191 threadedly receiving a shaft 192, the inner end of which engages a braking member or lock shoe 193 to force it into contact with the casting 120 (FIGS. 21, 22, 29 and 30). The shoe 193 is of the configuration shown in FIGURES 29 and 30. An actuating knob 194 is secured to the outer end of the shaft 192. Release rotation of the knob 194 permits movement of the assembly 70 along the radial arm 68 to a selected position. One bolt 187 is surrounded by an eccentric sleeve 178' having a hexagonal head 179, which extends through the casting 190, the retainer 184, and the race 183 (FIGS. 16, 22, 31, 32). Upon freeing of this bolt 187, and upon loosening of the other bolt 187 and the bolts 186, the eccentric sleeve 178' can be rotated through its hexagonal head 179 to move the right hand race 183 and retainer 184 towards or away from the casting 120. Only one race 183 need be adjustable relative to the casting 120, since, in effect, the two races 183 clamp the casting 120 between them. To secure the right hand race 183 in its adjusted position, setscrews 167 are provided which are threadedly mounted in the base casting 180 and engage cavities in the bottom of the right hand race 183 (FIG. 21).

A front bumper 195 is secured in a cavity 195' in the carriage base casting 180 for stopping engagement with the head of a bolt stop 189 (FIGS. 2, 6, 8, 12, 20 and 41). A rear bumper 196 is secured in a well 196' formed in the casting 180 and engages the bearing portion 121 of the casting 120 (FIGS. 2 and 20).

The yoke member 171, which is of the configuration shown in FIGURES 4, 12, 17 and 18, rotatably suspended from the carriage base casting 180 by a plate 198, a bolt 199 which is welded to the plate 198 and extends centrally therethrough, and a large nut 20 to which an actuating handle 201 is secured (FIGS. 4, 12, 14 and 19). The plate 198 has an annular series of holes 202. A setscrew 203 is threadedly mounted in the yoke member 171 and extends into a selected hole 202 to maintain the plate 198 and the yoke member 171 against relative rotation (FIG. 14).

For indexing the yoke member 171 and the carriage unit 170, apertures 206 are provided in the bight portion 207 of the former. A vertically movable shaft 208 extends freely through suitable aligned openings in the retainer 184 and in the carriage race 183, is supported in a heeling adjustment plug or member 209 cut out of the carriage base casting 180, and is biased by a compression spring 210 into a selected aperture 206, as shown in FIGURE 14. The spring 210 bears against a shoulder of the shaft 208 and a retaining plate 211 secured to the top of the retainer 184 by the bolts 186. A knob 212 is provided for raising the shaft 208 against the spring 210 to permit rotation of the yoke member 171 relative to the carriage unit 170.

The heeling adjustment plug 209 provided to eliminate blade "crabbing" is of the configuration shown in FIGURES 2, 14, 45, 46 and 47, being longitudinally movable about one sixteenth of an inch each way from a central position in a cavity of similar cross section formed in the carriage base casting 180. A little lateral movement is permitted, since the actual adjustment is arcuate. The bolts 186, one at each side of the shaft 208, extend freely through the plate 211 and through aligned apertures in the retainer 184, in the carriage race 183, and in the carriage base casting 180, and threadedly engage threaded openings 205 in the flat or flange portions of the plug 209 to rigidly clamp the plug 209 against the bottom of the carriage base casting 180. Hence, if the saw blade is not truly parallel with the radial arm 68 when the shaft 208 is in the proper aperture 206, as may occur in manufacture, even though every effort is made to prevent it, adjustment of the plug 209 which supports the shaft 208 will bring the saw blade into true parallelism. Once thus adjusted, it is seldom necessary to repeat the adjustment.

The yoke member 171 has depending parallel legs 215 and 216 (FIGS. 3 and 12). The leg 215 rotatably receives a trunnion 217 secured to the casing of the motor 172. The leg 216 rotatably receives an annular bearing member 218 having an integral handle 219 by means of which the assembly 70 is manipulated. The bearing member 218 is secured by bolts 220 to a plate 221 welded or otherwise secured to the casing of the motor 172 (FIGS. 12, 13–36). For indexing the bearing member 218 and the yoke leg 216, the bearing member 218 has spaced wells 225 into which a plunger 226 disposed in a bore 227 in the yoke leg 216 is biased by a compression spring 228 bearing against the top of the plunger 226 and a retainer cup 229. A hand piece 230 is secured to the plunger 226 for lifting the same to release the bearing member 218.

For positioning the bearing member 218, hence, the motor 172, in positions other than as provided by the just described indexing parts, a bore 233 is provided in the bearing member 218 (FIGS. 12, 34–36, 40). At each end of the bore 233 is a brake shoe 234 of suitable fibre material (FIG. 40), between which is a cylindrical member 235 of resilient material. A threaded bore 237 opens into the bore 233 and is at right angles thereto. In the inner end of the bore 237 is a reciprocable member 238 which the inner end of a threaded shaft 239 engages. A knob 240 is secured to the free end of the shaft 239 for rotation thereof. Rotation of the knob 240 will effect inward movement of the member 238, thereby compressing the member 235 which will apply pressure to the brake shoes 234 and positively retain the bearing member 218 in selected position. The separate member 238 is employed to avoid rotary frictional engagement of the end of the shaft 239 with the cylindrical member 235. An indexing scale 241 is attached to or marked on the yoke leg 216, and a pointer 242 is secured to the bearing member 218 (FIGS. 34 and 38).

The saw blade 173 is secured upon the rotor shaft 244 of the motor 172 as by a nut 245 (FIG. 4). The guard 174 fits over the saw blade 173 and is secured to the housing of the motor 172 by a suitable screw 246. The guard 174 incorporates a dust removal vent 248 to which may be connected an exhaust line 249 under vacuum.

An electric power cord 254 with a suitable plug 255 for the motor 172 enters the rear end of the casting 120 through a grommet 256 of suitable insulation mounted in a plate 257 secured by screws 8 to the casting 120 (FIGS. 1, 5, 6, 7), and traverses the length thereof to an "on" and "off" switch 259 mounted through the top of the casting 120 near the front end by a bracket 260 secured thereto by screws 261 (FIG. 8). A power cord 262 runs from the switch 259 to the motor 172.

For streamlining purposes, the casting 120 is sheathed in a cover 265. Similarly, covers 266 and 267 are disposed over and move with the ball bearing retainers 184 and associated parts. Scales 268 and 269 are secured to the cover 265 with which cooperate pointers 270 and 271, respectively, secured to the covers 266 and 267, respectively (FIG. 1).

The various adjustments and operations of the saw 60 are apparent from the foregoing description and the drawings.

Manifestly, there has been provided a radial arm saw which fulfills the objects and advantages sought therefor.

It is to be understood that the foregoing description and the accompanying drawings have been given by way of illustration and example. It is also to be understood that changes in form of the elements, substitution of equivalent elements, and rearrangement of parts, which will be readily apparent to those skilled in the art, are contemplated as within the scope of the present invention, which is limited only by the claims which follow.

What is claimed is:

1. In combination, a radial arm saw, including a base, a supporting column, a radial arm rotatably mounted on said supporting column, releasable means for locking said radial arm in selected position including a locking member secured to said column having spaced pairs of apertures separated by a camming tooth, a clothes pin type latch pin selectively engageable with a camming tooth, said latch pin being reciprocably disposed in a bore formed in the radial arm and expandable by an engaged camming tooth against the walls of said bore, means for initially breaking the camming engagement of said latch pin with said engaged camming tooth and the walls of said bore, means for withdrawing said latch pin to free it from an engaged tooth, and a second means for locking the radial arm in respect to said column in positions other than the provided indexing positions, said two locking means including a common actuator rod manually operable from the front of the radial arm, said actuator rod being mounted in said arm for reciprocal movement and being connected to said clothes pin type latch pin for moving it into and out of engagement with a selected camming tooth.

2. In combination, a radial arm saw, including a base, a supporting column, a radial arm rotatably mounted on said supporting column, releasable means for locking said radial arm in selected position including a locking member secured to said column having spaced pairs of apertures separated by a camming tooth, a clothes pin type latch pin selectively engageable with a camming tooth, said latch pin being reciprocably disposed in a bore formed in the radial arm, means for forcing said latch pin onto a selected tooth to expand the legs thereof into locked engagement with the bore to eliminate play between said column and radial arm, and means for withdrawing said latch pin to free it from an engaged tooth including means for breaking the locked engagement of the latch pin in the bore prior to release withdrawal of the latch pin, and a second means for locking the radial arm in respect to said column in positions other than the provided indexing positions, said two locking means including a common actuator rod manually operable from the front of the radial saw, said actuator rod being mounted in said arm for reciprocal movement and being connected to said clothes pin type latch pin for moving it into and out of engagement with a selected camming tooth.

3. In combination, a radial arm saw, including a base, a supporting column, a radial arm rotatably mounted on said supporting column, releasable means for locking said radial arm in selected position including a locking member secured to said column having spaced pairs of apertures separated by a camming tooth, a clothes pin type latch pin selectively engageable with a camming tooth, said latch pin being reciprocably disposed in a bore formed in the radial arm and expandable by an engaged camming tooth against the walls of said bore, means for initially breaking the camming engagement of said latch pin with said engaged camming tooth and the walls of said bore, means for withdrawing said latch pin to free it from an engaged tooth, and a second means for locking the radial arm in respect to said column in positions other than the provided indexing positions, said two locking means including a common actuator rod manually operable from the front of the radial saw, said second locking means including a brake shoe engageable with the column, a rotatable member for forcing the brake shoe into holding engagement with the column, and means connecting the rotatable member with the actuator rod for rotation of the former by the latter, said actuator rod being mounted in said arm for reciprocal movement and being connected to said clothes pin type latch pin for moving it into and out of engagement with a selected camming tooth.

4. In combination, a radial arm saw, including a base, a supporting column, a radial arm rotatably mounted on said supporting column, releasable means for locking said radial arm in selected position including a locking member secured to said column having spaced pairs of apertures separated by a camming tooth, a clothes pin type latch pin seleceitvely engageable with a camming tooth, said latch pin being reciprocably disposed in a bore formed in the radial arm, means for withdrawing said latch pin to free it from an engaged tooth, and a second means for locking the radial arm in respect to said column in positions other than the provided indexing positions, said two locking means including a common actuator rod manually operable from the front of the radial saw, said second locking means including a brake shoe engageable with the column, a rotatable member for forcing the brake shoe into holding engagement with the column, and a sleeve connecting the rotatable member with the actuator rod for rotation of the former by the latter, said sleeve having an annular flange, said annular flange being engageable with said latch pin of the indexing locking means for reciprocable movement thereof.

5. In combination, a radial arm saw, including a base, a supporting column, a radial arm rotatably mounted on said supporting column, releasable means for locking said radial arm in selected position including a locking member secured to said column having spaced pairs of apertures separated by a camming tooth, a clothes pin type latch pin selectively engageable with a camming tooth, said latch pin being reciprocably disposed in a bore formed in the radial arm, means for forcing said latch pin onto a selected tooth to expand the legs thereof into locked engagement with the bore to eliminate play between said column and radial arm, and means for withdrawing said latch pin to free it from an engaged tooth including means for breaking the locked engagement of the latch pin in the bore prior to release withdrawal of the latch pin, and a second means for locking the radial arm in respect to said column in positions other than the provided indexing positions, said two locking means including a common actuator rod manually operable from the front of the radial saw, said second locking means including a brake shoe engageable with the column, a rotatable member for forcing the brake shoe into holding engagement with the column, and means connecting the rotatable member with the actuator rod for rotation of the former by the latter, said actuator rod being mounted in said arm for reciprocal movement and being connected to said clothes pin type latch pin for moving it into and out of engagement with a selected camming tooth.

6. In combination, a radial arm saw, including a base, a supporting column, a radial arm rotatably mounted on said supporting column, a releasable means for locking said radial arm in selected position including a locking member secured to said column having spaced pairs of apertures, separated by a camming tooth, a clothes pin type latch pin selectively engageable with a camming tooth, said latch pin being reciprocably disposed in a bore formed in the radial arm, means for forcing said latch pin onto a selected tooth to expand the legs thereof into locked engagement with the bore to eliminate a play between said column and radial arm, and means for withdrawing said latch pin to free it from an engaged tooth including means for breaking the locked engagement of the latch pin in the bore prior to release withdrawal of the latch pin, and a second means for locking the radial arm in respect to said column in positions other than the provided indexing positions, said two locking means including a common actuator rod manually operable from the front of the radial saw, said second locking means including a brake shoe engageable with the column, a rotatable member for forcing the brake shoe into holding engagement with the column, and means connecting the rotatable member with the actuator rod for rotation of the former by the latter, and a sleeve connecting the rotatable member with the actuator rod for rotation of the former by the latter, said sleeve having an annular flange, said annular flange being engageable with said latch pin of the indexing locking means for reciprocable movement thereof.

References Cited in the file of this patent

UNITED STATES PATENTS

| | | |
|---|---|---|
| 390,190 | Richards | Sept. 25, 1888 |
| 625,054 | McKernan | May 16, 1894 |
| 992,008 | Lane | May 9, 1911 |
| 1,528,536 | De Walt | Mar. 3, 1925 |
| 1,563,636 | Lewis | Dec. 1, 1925 |
| 1,636,924 | Porter | July 26, 1927 |
| 1,664,888 | Klausmeyer | Apr. 3, 1928 |
| 1,813,568 | De Walt | July 7, 1931 |
| 1,956,835 | Roemer | May 1, 1934 |
| 2,022,288 | Knapp | Nov. 26, 1935 |
| 2,290,766 | Pegard | July 21, 1942 |
| 2,329,357 | Mowery | Sept. 14, 1943 |
| 2,330,004 | Neville | Sept. 21, 1943 |
| 2,343,243 | Roemer | Mar. 7, 1944 |
| 2,353,088 | Schutz | July 4, 1944 |
| 2,356,610 | Penney | Aug. 22, 1944 |
| 2,525,712 | Neighbour | Oct. 10, 1950 |
| 2,584,863 | Gesner | Feb. 5, 1952 |
| 2,589,554 | Killian | Mar. 18, 1952 |
| 2,590,119 | Osterhus | Mar. 25, 1952 |
| 2,628,643 | Tompkins | Feb. 17, 1953 |
| 2,722,952 | Snyder | Nov. 8, 1955 |